US006890069B2

(12) United States Patent
Matsui

(10) Patent No.: US 6,890,069 B2
(45) Date of Patent: May 10, 2005

(54) INK-JET RECORDING APPARATUS AND INK-JET RECORDING PROCESS

(75) Inventor: Shinya Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/736,746

(22) Filed: Dec. 17, 2003

(65) Prior Publication Data

US 2004/0125186 A1 Jul. 1, 2004

Related U.S. Application Data

(62) Division of application No. 10/080,677, filed on Feb. 25, 2002, now Pat. No. 6,752,494.

(30) Foreign Application Priority Data

Feb. 27, 2001 (JP) .................................... 2001-051523

(51) Int. Cl.[7] ........................... G01D 11/00; B41J 2/21

(52) U.S. Cl. ...................................... 347/100; 347/43

(58) Field of Search ............................ 347/22–36, 43, 347/100, 14, 37

(56) References Cited

U.S. PATENT DOCUMENTS

| | | | | |
|---|---|---|---|---|
| 5,568,169 A | * | 10/1996 | Dudek et al. | 347/43 |
| 5,992,973 A | | 11/1999 | Wen | |
| 6,168,259 B1 | * | 1/2001 | Capurso | 347/36 |
| 6,178,009 B1 | | 1/2001 | Yamada et al. | |
| 6,239,817 B1 | * | 5/2001 | Meyer | 347/36 |
| 6,428,143 B1 | * | 8/2002 | Irihara et al. | 347/43 |

FOREIGN PATENT DOCUMENTS

| | | |
|---|---|---|
| EP | 0 962 324 | 12/1999 |
| EP | 1 043 166 | 10/2000 |
| EP | 1 063 267 | 12/2000 |
| JP | 10-95107 | 4/1998 |
| JP | 10-128964 | 5/1998 |
| JP | 11-227229 | 8/1999 |
| JP | 11-323221 | 11/1999 |
| JP | 2000-198957 | 7/2000 |
| JP | 2000-230143 | 8/2000 |
| JP | 2000-309732 | 11/2000 |

* cited by examiner

*Primary Examiner*—Lamson Nguyen
*Assistant Examiner*—Ly T Tran
(74) *Attorney, Agent, or Firm*—Fitzpatrick, Cella, Harper & Scinto

(57) ABSTRACT

A novel ink-jet recording apparatus is provided for conducting margin-free recording on the peripheral area of the recording medium including the edge thereof with excellent image quality even in the peripheral area in comparison with quality of the usual printing having a margin. A process therefor is also provided.

9 Claims, 8 Drawing Sheets

INK-JET RECORDING APPARATUS AND INK-JET RECORDING PROCESS

This application is a division of application Ser. No. 10/080,677 filed Feb. 25, 2002 now U.S. Pat. No. 6,752,494.

BACKGROUND OF THE INVENTION

1. Field of the Invention

The present invention relates to an ink-jet recording apparatus, particularly to an ink-jet recording apparatus for "margin-free recording" for printing on the peripheral area including the edge of a recording medium, the apparatus comprising a printing system provided with plural ink-ejecting devices and a controller for selecting a low-penetrable ink and a high-penetrable ink for the areas of the recording medium for image formation. The present invention also relates to an ink-jet recording method employing the ink-jet recording apparatus.

2. Related Background Arts

Known recording apparatuses having a function of a printer, a copying machine, a facsimile machine, or the like, and known recording apparatuses employed as output devices of combined type electronic apparatuses including computers and word processors are constituted to form desired images on a recording medium in accordance with image information. The ink-jet recording apparatus is one of such recording apparatuses. The ink-jet recording apparatus conducts recording by ejecting an ink from a recording head onto a recording medium in accordance with image information. The ink-jet recording apparatus has advantages of compactness of the recording head, high speed of recording with high fineness of recorded images, needlessness of special treatment of printing paper, low running cost, low noise generation, ease of full color image recording with multiple color inks, and so forth.

In recording with the aforementioned ink-jet recording apparatus, the image is not usually formed on the peripheral area of the recording medium. For example as shown in FIG. 7, the image is usually formed in the image formation area 50, but is not formed in the peripheral area 51 of the recording medium. Ink-jet recording has been widely popularized, and is employed in recording on various recording media for various purposes. Consequently, ink-jet recording is employed occasionally in "margin-free recording" which records images on a peripheral area of the recording medium including its edge.

In the margin-free recording by an ink-jet system with a liquid ink such as an aqueous dye ink or an aqueous pigment ink, the ink adhered to an ink-absorbing member provided on a platen is liable to stain the reverse face of the recording medium. Moreover, in the margin-free recording, the recording medium such as a paper sheet is liable to jam to cause sheet delivery failure. Therefore, various techniques are disclosed for practicing the margin-free recording. For example, Japanese Patent Application Laid-Open No. 10-128964 discloses an ink-jet recording apparatus which comprises a guiding means and an ink-receiving means: the guiding means being provided inside the edges of the recording medium sheet so as to be movable in accordance with the size of the recording medium in the direction perpendicular to the recording medium delivery direction, and the ink-receiving means for receiving the ink from the recording head being provided adjacent to the guiding means outside the direction perpendicular to the recording medium delivery direction.

Japanese Patent Application Laid-Open No. 11-227229 discloses a selective use of a pigment ink and a dye ink according to the type of the recording paper sheet and the type of the image to be recorded. In the known jet printing systems, the selective use of the inks according to the type of recording paper sheets and of the images is frequently employed in black color expression. In these systems, the recording is conducted by selecting a suitable ink for the recording medium and the type of image from among a low-penetrable pigment ink, a high-penetrable dye ink, and a so-called process black (hereinafter referred to as "PCBk"). For example, for printing black letters on a plain paper sheet, a low-penetrable black pigment ink is selectively used, or a high-penetrable dye ink is firstly applied and thereon the low-penetrable black pigment ink is applied. For printing images of black letters on an ink-jet printing paper sheet, a high-penetrable dye ink is selected. For printing a landscape or a portrait other than letters, a black ink is used for UCR (under color removal) in a high-density portion, or a process black is used on a low-density non-colored portion in place of the black ink. However, these methods select the ink depending on the type of the recording paper sheet or the type of the image to be formed, but do not select the ink depending on the image formation area of a recording medium.

SUMMARY OF THE INVENTION

The inventors of the present invention made comprehensive investigation to solve the problems involved in the margin-free recording. Thereby, the inventors of the present invention found that occurrence of the staining on the reverse face of the recording medium and failure of delivery of the recording medium like paper sheets depend on the type of the ink used for the margin-free recording, and have completed the present invention. In recent years, inks employing a pigment as a coloring material (hereinafter referred to as "pigment ink") for ink-jet recording have been developed in addition to aqueous dye inks and are coming to be widely used to meet the demands for high water-resistance or high light-fastness in some uses. In particular, pigment inks are widely used for formation of black letters and images of high quality.

However, regarding the margin-free recording, according to the investigation by the inventors of the present invention, the staining or delivery failure of the recording medium depends on the properties of the ink as explained below. When a high-penetrable ink like a dye ink adheres onto an ink-absorbing member set on a platen, the dye ink can be absorbed by the ink not to cause the staining or delivery failure of the recording medium. On the contrary, when a low-penetrable ink adheres onto the ink-absorbing member, the pigment tends to remain on the surface of the ink-absorbing member to cause the staining or delivery failure of the recording medium.

The present invention intends to provide an ink-jet recording apparatus which is capable of recording a satisfactory image even in margin-free recording in which recording is conducted in the peripheral area of the recording medium including the edge thereof, similarly as in usual image formation in which an image is not formed on the periphery portion of the recording medium. The present invention also intends to provide an ink-jet recording process by use of the above ink-jet recording apparatus.

According to one aspect of the present invention, there is provided an ink-jet recording apparatus comprising a low-penetrable ink which tends to accumulate an ink component on an ink-absorbing member, and a high-penetrable ink which less tends to accumulate an ink component on the ink-absorbing member, wherein the ink-jet recording apparatus is so controlled, as to use only the high-penetrable ink therefor when forming an image even in a peripheral area of a recording medium including the edge thereof.

According to another aspect of the invention, there is provided an ink-jet recording apparatus comprising a low-penetrable ink which tends to accumulate an ink component on an ink-absorbing member, and a high-penetrable ink which less tends to accumulate an ink component on the ink-absorbing member, wherein the ink-jet recording apparatus is so controlled as to gradually decrease the amount of the low-penetrable ink to be applied and as to gradually increase the amount of the high-penetrable ink to be applied toward the edge of a recording medium when forming an image even in a peripheral area of a recording medium including the edge thereof.

According to another aspect of the invention, there is provided an ink-jet recording process comprising at least one of the steps of: (i) applying a low-penetrable ink which tends to accumulate an ink component on an ink-absorbing member; and (ii) applying a high-penetrable ink which less tends to accumulate an ink component on the ink-absorbing member, wherein an image is formed by controlling the process so as to use only the step (ii) when forming an image even in a peripheral area of a recording medium including the edge thereof.

According to another aspect of the invention, there is provided an ink-jet recording process comprising at least one of the steps of: (i) applying a low-penetrable ink which tends to accumulate an ink component on an ink-absorbing member; and (ii) applying a high-penetrable ink which less tends to accumulate an ink component on the ink-absorbing member, wherein an image is formed by controlling the step (i) so as to gradually decrease the amount of the low-penetrable ink to be applied and by controlling the step (ii) so as to gradually increase the amount of the high-penetrable ink to be applied toward the edge of a recording medium when forming the image even in a peripheral area of a recording medium including the edge thereof.

According to another aspect of the invention, there is provided an ink-jet recording apparatus for printing on a recording medium with an ink, or a reaction product of the ink and a liquid composition that reacts with the ink when coming into contact with the ink, comprising an ink, a liquid composition, an ink-jet head for ejecting the ink, and a means for applying the liquid composition onto the recording medium, wherein the apparatus further comprises a control means for printing only with the ink when forming an image on a peripheral area of the recording medium including the edge thereof.

According to another aspect of the invention, there is provided a process for forming an image on a recording medium with a reaction product of an ink and a liquid composition capable of reacting with the ink when coming into contact with the ink, comprising the steps of:

(i) applying the ink to the recording medium, and
(ii) applying the liquid composition to the recording medium,
the step (ii) being conducted so as to form at least the reaction product of the ink and the liquid composition on the recording medium,
wherein the process further comprises a controlling step to conduct printing by employing only the step (i) when forming the image even on a peripheral area of the recording medium including the edge thereof.

According to another aspect of the invention, there is provided a process for forming an image on a recording medium with a reaction product of an ink and a liquid composition that reacts with the ink when coming into contact with the ink, comprising steps of:

(i) applying the ink to the recording medium, and
(ii) applying a prescribed amount of the liquid composition to the recording medium,
the step (ii) being conducted so as to form at least the reaction product of the ink and the liquid composition on the recording medium,
wherein the process further comprises a controlling step to apply the liquid composition to a peripheral area of the recording medium including the edge thereof in step (ii) in an amount smaller than the prescribed amount when forming the image even on the peripheral area.

DETAILED DESCRIPTION OF THE PREFERRED EMBODIMENTS

The present invention is described in more detail by reference to preferred embodiments.

The inventors of the present invention made comprehensive investigation to solve the problems involved in the margin-free recording. Thereby, the inventors of the present invention found that occurrence of the staining on the reverse face of the recording medium and failure of delivery of a paper sheet or a like recording medium depend on the type of the ink used in the margin-free recording, and have completed the present invention. In recent years, inks employing a pigment as a coloring material for ink-jet recording have been developed in addition to aqueous dye inks and are coming to be widely used to meet the demands for high water-resistance or high light-fastness in some uses. According to the investigation made by the inventors of the present invention, the staining or delivery failure of the recording medium depends on the properties of the ink as explained below.

The ink shot from a recording head onto an ink-absorbing member behaves as explained below by reference to FIGS. 4 and 5. The ink-absorbing member employed may be any known porous material used as an ink-absorbing member set on a platen, including laminates of fibrillated or hydrophilicity-treated fibers such as cellulose, rayon, acrylics, polyurethanes, polyesters, and the like singly or in combination thereof; porous polyethylene; and melamine foam.

Figure 4:
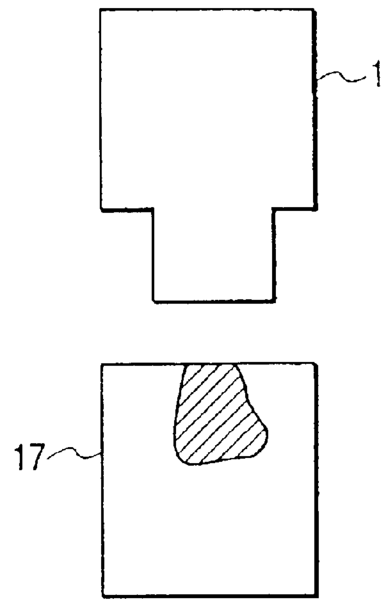
FIG. 4 schematically illustrates a state of an ink shot onto an ink-absorbing member.
Figure 5:
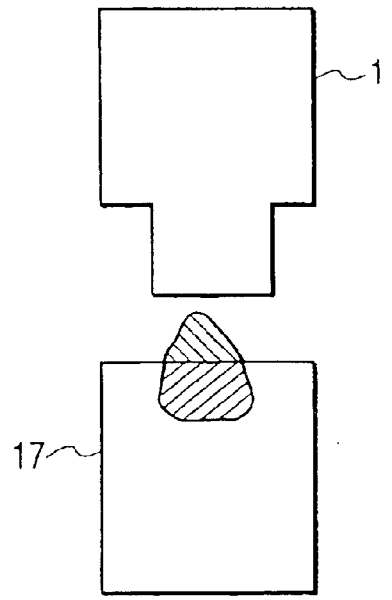
FIG. 5 schematically illustrates another state of an ink shot onto an ink-absorbing member.

FIGS. 4 and 5 schematically illustrate the state of the ink shot from the ink-jet recording head onto the aforementioned ink-absorbing member. FIG. 4 shows schematically a state of an ink containing a less accumulative ink component projected onto the aforementioned ink-absorbing member. In this case, when the ink is shot from a recording head onto the ink-absorbing member, the ink components are quickly absorbed by the ink-absorbing member to penetrate therein as shown by the oblique-line shadow in FIG. 4. Such a high-penetrable ink, which has ink components less accumulative onto the ink-absorbing member, includes dye inks containing a water-soluble dye such as direct dyes, acid dyes, basic dyes and dispersion dyes dissolved into an aqueous liquid medium, and pigment inks which contains a pigment as a coloring material and a penetrant for increasing the penetrability to the recording medium. Such inks include known aqueous dye inks for ink-jet recording. In the explanation below, the high-penetrable ink less accumulative onto the ink-absorbing member is occasionally referred to as a dye ink as a typical example.

FIG. 5 schematically shows a state of a low penetrable ink containing an accumulative ink component projected onto the aforementioned ink-absorbing member. In this case, when the ink is shot from a recording head onto the ink-absorbing member, the ink components not absorbed by the ink-absorbing member remain on the ink-absorbing member 17 to form an accumulated region. The low-penetrable ink containing an ink coloring component accumulative onto the ink-absorbing member includes pigment inks containing a pigment, as a main coloring material, dispersed in an aqueous medium, and inks containing a less soluble coloring material, as disclosed in Japanese Patent Application Laid-Open Nos. 2000-309732, 2000-230143, 2000-198957, 11-323221, and so forth. When such a low-penetrable ink is shot from a recording head onto the ink-absorbing member, a part of the ink components including the liquid medium will penetrate into the ink-absorbing member, whereas the less soluble pigment and other components will accumulate. Thereby the ink will be separated into a portion of the ink having penetrated into the absorbent and another portion remaining accumulated on the absorbent as shown by oblique-line shadows in FIG. 5. Similar phenomenon as above is observed in the case of an ink containing a pigment as a main coloring material and additionally a highly soluble dye for color correction. In the description below, the low-penetrable ink accumulative onto the ink-absorbing member is occasionally referred to as a pigment ink as the typical example.

A measure of the penetrability of an ink into a recording medium is a Ka value. The amount V (mL/$m^2$) of the ink having penetrated at time t from the ink ejection, which represents the ink penetrability, is known to be represented by Bristow's Equation below:

$$V=Vr+Ka(t-tw)^{1/2} \quad (t>tw)$$

Immediately after the landing of the ink droplets onto the surface of the recording medium, most of the ink droplets are absorbed by the unevenness of the surface (roughness of the recording medium), and only a very small portion penetrates into the recording medium. In the above equation, the time before beginning of the penetration is represented by tw (contact time), and the absorbed amount at the hollow-protrusion is represented by Vr. After lapse of time tw, the amount of the penetration increases in proportion to the square root of the time (t−tw). Ka is the proportion coefficient for the increase of the penetration amount, corresponding to the penetration speed.

The Ka value was measured according to the Bristow method with a Dynamic Penetrability Tester S (manufactured by Toyo Seiki Seisakusho K.K.) for liquid. The recording medium employed in the experiment was a PB Paper Sheet supplied by Canon Inc. The PB paper sheet is useful both for electrophotographic copying and LBP printing and for ink-jet recording. The Ka value of the ink depends on the type and amount of the surfactant added to the ink, and other factors. Specifically, for example, the penetrability of the ink can be increased by addition of a nonionic surfactant, such as ethylene oxide-2,4,7,9-tetramethyl-5-decyne-4,7-diol (Acetylenol, trade name, produced by Kawaken Fine Chemical K.K.). The ink not containing the Acetylenol has low penetrability, and behaves as a low-penetrable ink defined later. The ink containing Acetylenol at a content of 1 mass % penetrates in a short time into the recording paper sheet, behaving as a high-penetrable ink. The ink containing Acetylenol at a content of 0.35 mass % behaves as a medium-penetrable ink.

TABLE 1

| | Ka $mL/m^2 \cdot msec^{1/2}$ | Acetylenol content(AC) mass % | Surface tension(ST) mN/m |
|---|---|---|---|
| Low-penetrable ink | Ka < 1.0 | 0 ≦ AC < 0.2 | 40 ≦ ST |
| Medium-penetrable ink | 1.0 ≦ Ka < 5.0 | 0.2 ≦ AC < 0.7 | 35 ≦ ST < 40 |
| High-penetrable ink | 5.0 ≦ Ka | 0.7 ≦ AC | ST < 35 |

Table 1 above shows the ranges of the Ka value, acetylenol content, and surface tension of the low-penetrable inks, the medium-penetrable inks, and the high-penetrable inks. The higher Ka value of the ink shows higher penetrability of the ink into the recording paper sheet. In other words, the lower surface tension gives higher penetrability thereof.

The Ka values shown in Table 1 were measured by means of a Dynamic Penetrability Tester S (manufactured by Toyo Seiki Seisakusho K.K.) for liquid according to the Bristow method. PB paper sheets (supplied by Canon Inc.) were used for the test. The above standard in Table 1 can be used as a definition for the low-penetrable inks and high-penetrable inks. However, the definition of the low-penetrable and the high-penetrable inks is not limited at all to the above value in Table 1, provided that the object of the present invention is achievable.

The inventors of the present invention comprehensively investigated the method for conducting the margin-free recording with a dye ink or a pigment ink by an ink-jet system. Consequently, it was found that the pigment ink forms an ink accumulation on the ink-absorbing member 17 as shown in FIG. 5. Further it was found that, in many sheets of image formation, the ink accumulation can reach the recording medium delivery path to stain the reverse face of the recording medium, and the accumulated ink can protrude up to the recording medium delivery path to catch the end of the recording sheet and to cause failure in the recording medium delivery.

The ink-jet recording apparatus of the present invention employs a low-penetrable ink which has a low penetrability and tends to accumulate an ink component on an ink-absorbing member, and a high-penetrable ink which less tends to accumulate an ink component on the ink-absorbing member, the apparatus being controlled to use only the high-penetrable ink without using the low-penetrable ink when conducting the margin-free printing therefor. In another embodiment of the present invention, in the case of the margin-free recording, the ink-jet recording apparatus is controlled to gradually decrease the amount of application of the low-penetrable ink and to gradually increase the amount of application of the high-penetrable ink toward the edge of the recording medium, which is different from the above embodiment using no low-penetrable ink.

EXAMPLES

The present invention is explained below in more detail by reference to examples.

Example 1

With the ink-jet recording apparatus of this example, the margin-free recording was conducted by controlling the system to use only a high-penetrable ink and not to use a low-penetrable ink when conducting the margin-free recording, causing no stain on the recording medium or no paper jamming to achieve excellent margin-free printing. The ink-jet recording apparatus of this example forms an image according to the flow chart shown in FIG. 1. Before starting the ink-jet recording, judgement should be made whether or not margin-free recording is to be conducted to record an image on the peripheral area of the recording medium including the edge thereof. The recording apparatus is constituted to receive the information to decide the use or non-use of the low-penetrable ink, which is liable to accumulate on the ink-absorbing member.

Figure 1:
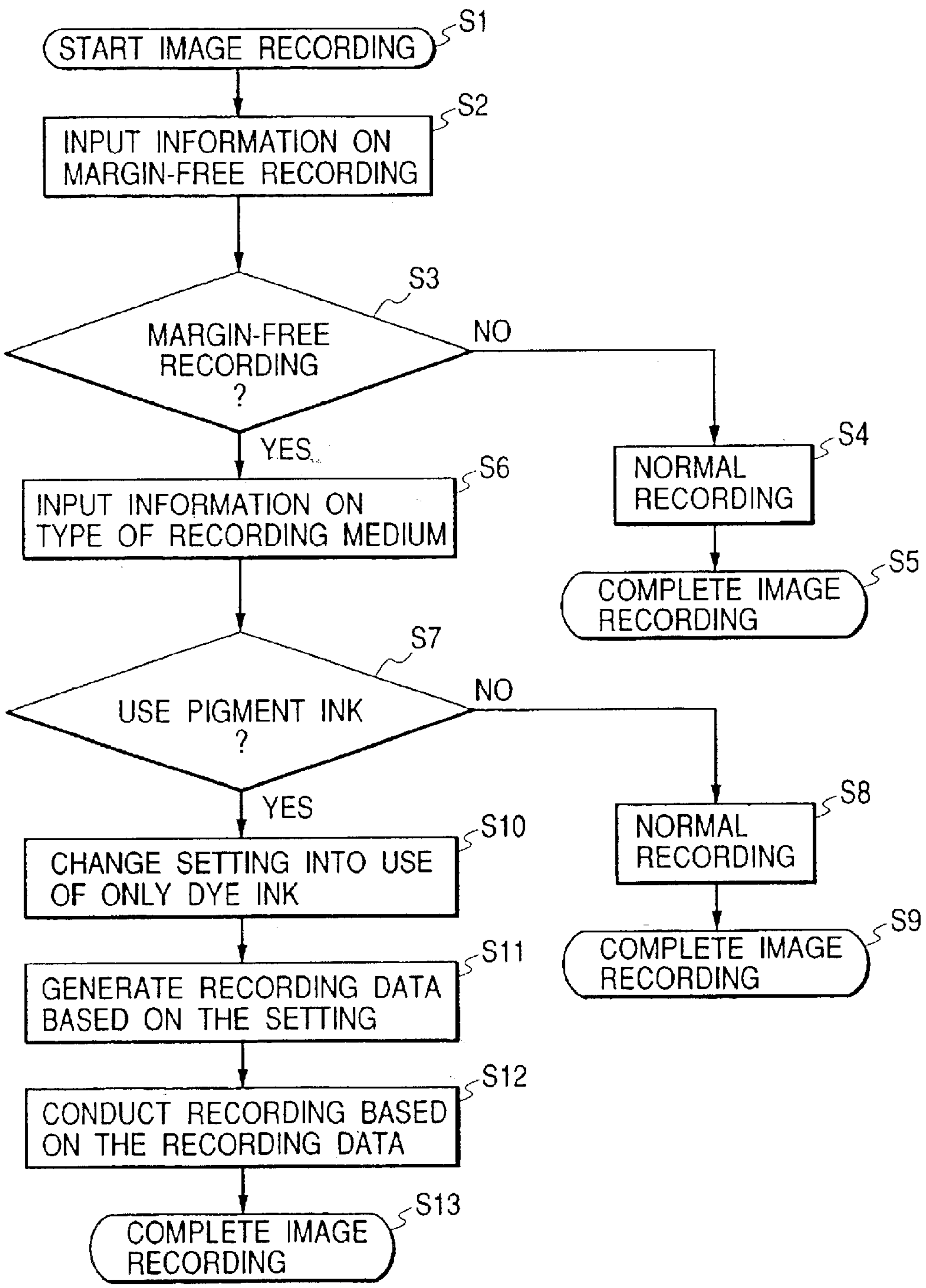
FIG. 1 is a flow chart of a recording process for the recording apparatus of the present invention.

FIG. 1 is a flow chart of the operation of the ink-jet recording apparatus of this example. The operation of the ink-jet recording apparatus of this example is explained by reference to this flow chart. Firstly, the information on whether the image to be formed is margin-free or normal is obtained (S2). From this information, it is judged whether the margin-free recording or the normal recording is to be conducted (S3). In the case where the margin-free recording is judged not to be conducted, normal recording is conducted with a pigment ink and a dye ink in combination (S4). On the other hand, in the case where the margin-free recording is judged to be conducted, the information on the type of a recording medium (recording paper sheet) is obtained (S6). Then use or non-use of a pigment ink is decided therefrom (S7). When the pigment ink is judged not to be used, normal recording is conducted with only a dye ink (S8). On the other hand, when the pigment ink is judged to be used, the kind of the ink is changed to a dye ink solely (S10), and recording data is prepared according to this setting (S11) to conduct recording with the dye ink (S12).

Figure 2:
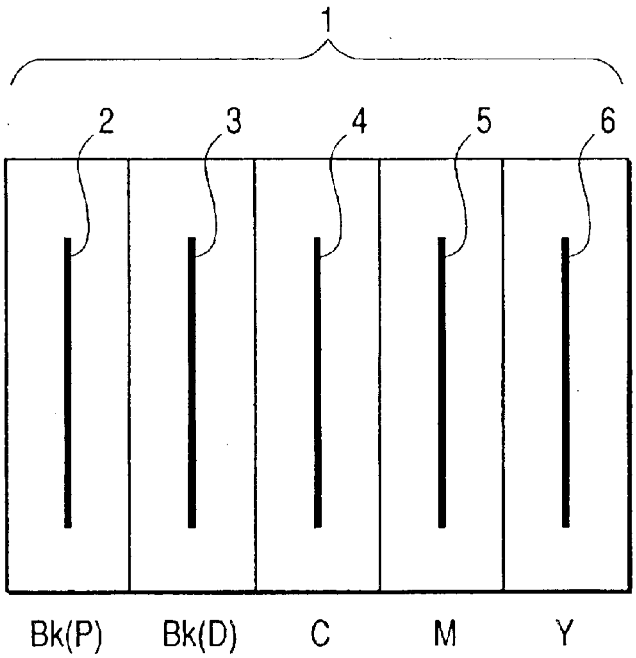
FIG. 2 is a schematic diagram of a recording head of the present invention.

FIG. 2 shows a recording head used for practicing the above operation flow with the ink-jet recording apparatus of this example. In FIG. 2, the numerals therein indicate respective ink ejection nozzle rows as follows: 2, a row of nozzles for a black pigment ink; 3, a row of nozzles for a black dye ink; 4, a row of nozzles for a cyan dye ink; 5, a row of nozzles for a magenta dye ink; and 6, a row of nozzles for a yellow dye ink. In normal recording with a dye ink and a pigment ink, nozzles of row 2 to row 6 in FIG. 2 are employed. In margin-free recording, when the setting for pigment ink is changed to the setting for dye ink since the pigment ink is originally to be used according to the type of the recording medium (S7), nozzles of row 3 to row 6 are employed with dye inks on the basis of the ink-jet recording data after density correction and color correction on the image data.

Figure 3:
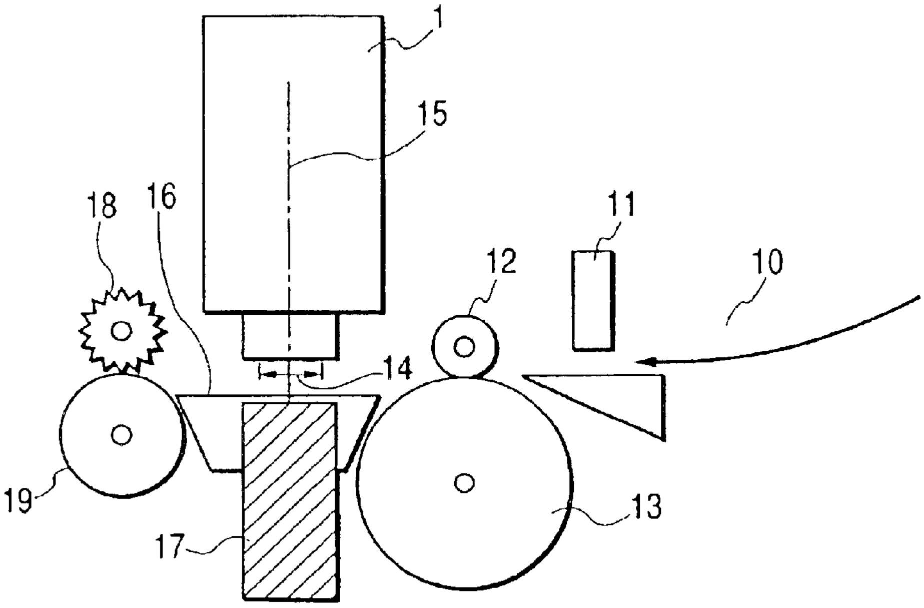
FIG. 3 is a sectional view of the recording apparatus of the present invention.

FIG. 3 is a sectional view showing the function of the recording part of the ink-jet recording apparatus of this example. In FIG. 3 the numerals therein indicate the respective members as follows: 10, a recording paper sheet path; 11, a paper sheet sensor; 12, a pinch roller; 13, a delivery roller; 14, a nozzle region of head 1, namely a head recording region; 15, the center position of the head recording region; 16, a platen; 17, an ink-absorbing member placed on the platen 16; 18, a spur; and 19, a paper sheet discharging roller.

In margin-free recording, the recording is conducted on the peripheral area of the recording paper sheet satisfactorily as below. The recording paper sheet is delivered through a paper sheet path 10 to the recording apparatus. A paper sheet sensor 11 detects the position of the front edge of the recording paper sheet. Thereby, the front edge of the recording paper sheet is delivered to the center position 15 of the head recording region. There, recording is conducted by the ink-jet recording head 1 on the recording paper sheet being fed at a prescribed feeding rate. After detection of the rear edge of the recording paper sheet by the paper sheet sensor, the recording on the rear edge of the recording paper sheet is conducted by positioning the rear end portion of the recording paper sheet in the head recording region 14.

In this example, in margin-free recording, a low-penetrable ink and a high-penetrable ink are combinedly used in recording in the peripheral area of the recording medium. This is different from Example 1 in which the low-penetrable ink is not used at all. In this Example 2, as described below, the ink-jet recording apparatus is controlled, for image formation in the peripheral area of a recording medium, to gradually decrease the amount of application of the low-penetrable ink and to gradually increase the amount of application of the high-penetrable ink toward the edge of the recording medium. Thereby, the margin-free recording could be successfully conducted similarly as in Example 1 without causing staining on the reverse face or jamming of the recording medium.

Figure 6:
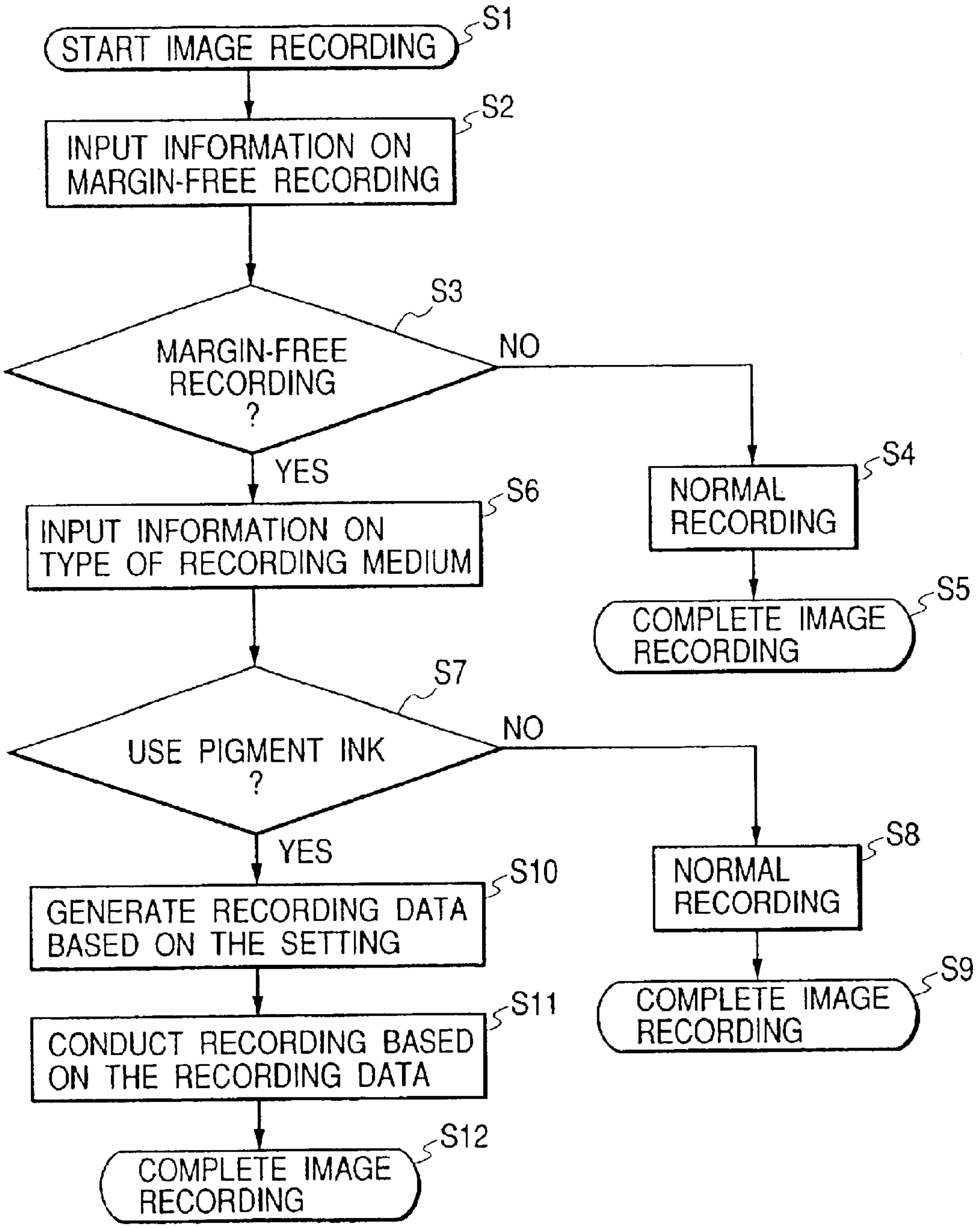
FIG. 6 is a flow chart of another recording process for the recording apparatus of the present invention.

The steps of image formation in this example are explained by reference to FIGS. 6, 7, 8A and 8B. As shown in FIG. 6, firstly, the information on whether the image to be formed is margin-free or normal is obtained (S2). From this information, it is judged whether the margin-free recording or the normal recording is to be conducted (S3). In the case where the margin-free recording is judged not to be conducted, normal recording is conducted with a pigment ink and a dye ink in combination (S4). On the other hand, in the case where the margin-free recording is judged to be conducted, the information on the type of a recording medium (recording paper sheet) is inputted (S6). Then use or non-use of a pigment ink is decided (S7). When the pigment ink is judged not to be used, normal recording is conducted with only a dye ink (S8). On the other hand, when the pigment ink is judged to be used in the recording, data for ink-jet recording for the peripheral area including the edge of the recording paper sheet is prepared according to the setting for the system (S10), and recording is conducted by combined use of a pigment ink and a dye ink (S11).

Figure 7:
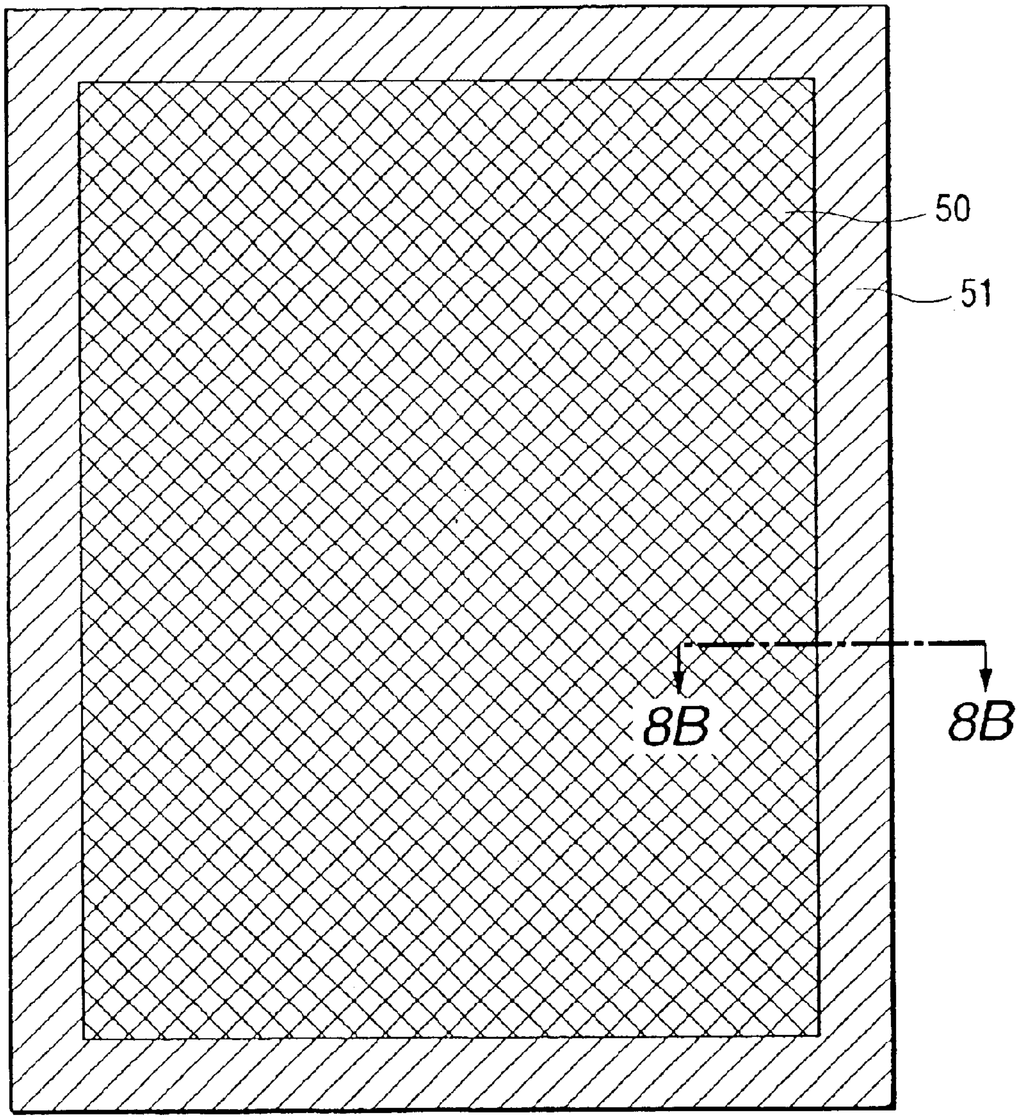
FIG. 7 is a plan view of a recorded product obtained in the present invention.
Figure 8A:
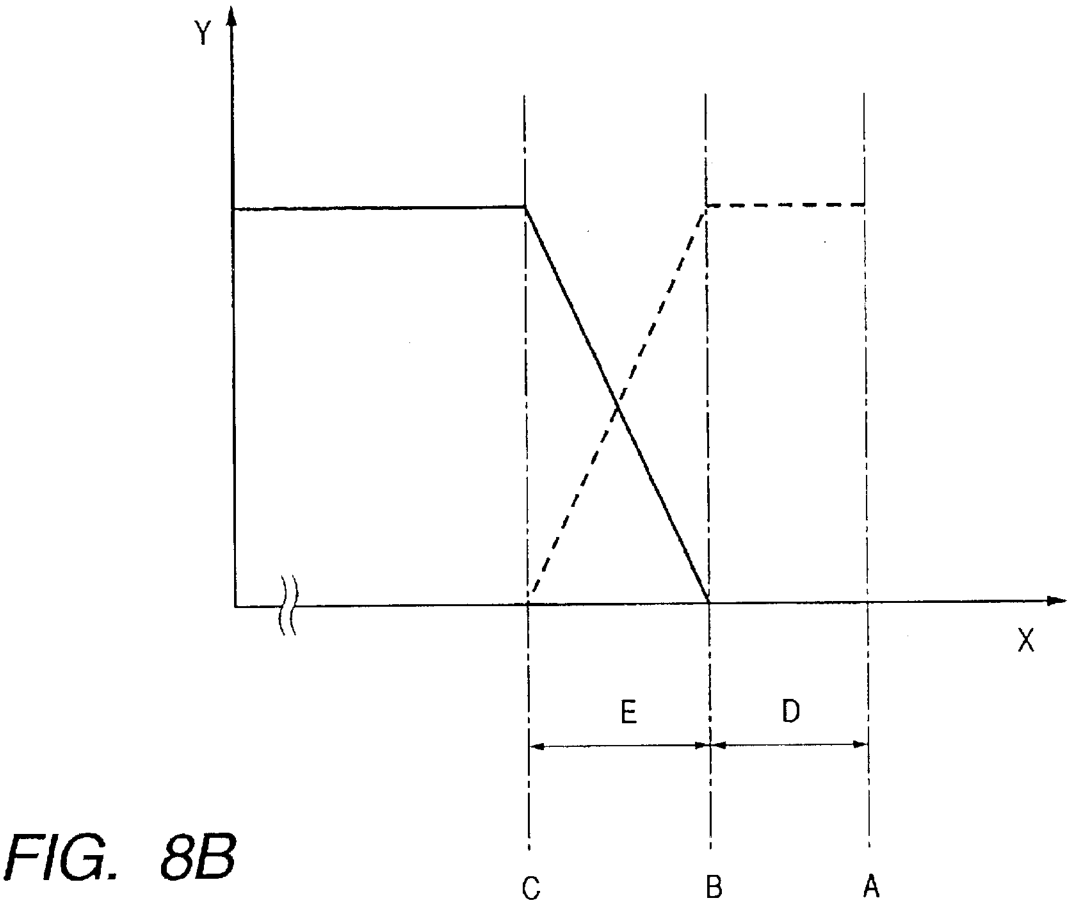
FIG. 8A shows the change of the applied amounts of the inks in the peripheral area of the recorded product obtained in the present invention.
Figure 8B:
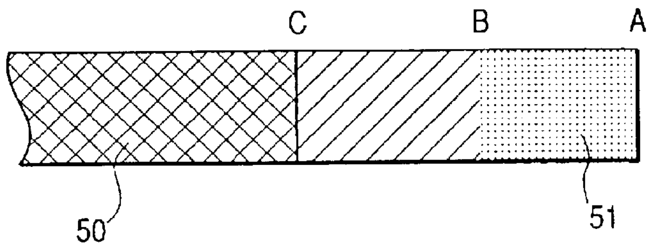
FIG. 8B is a sectional view taken along line 8B—8B in FIG. 7.

FIG. 7 is a plan view showing a state of a recorded sheet formed by margin-free recording on a recording paper sheet by means of an ink-jet recording apparatus of this example. In FIG. 7, in the grid-shadowed area 50, the image is formed by normal use of the pigment ink. Generally in ink-jet recording, letters are printed with a pigment only or with a pigment and a supplemental dye ink for overprinting or preliminary printing, and color images are usually printed with dye inks and a supplemental black pigment (usually, the pigment is of a black color). In this example, the image on the grid-shadowed area 50 is formed with a dye and a pigment, and the image on the oblique-line-shadowed area 51 (peripheral area) is formed by controlling the amount of the low-penetrable ink such as a pigment ink. This control is explained in detail by reference to FIGS. 8A and 8B. FIG. 8A shows the amount of shot in ink at each point on a peripheral area of a recording paper sheet. FIG. 8B is a sectional view taken along line 8B—8B in FIG. 7. The change of the amounts of the inks shot in the peripheral area of the recording paper sheet is explained below. In the graph in FIG. 8A, the solid line shows the amount of the pigment ink applied on the grid-shadowed area 50 and the peripheral area 51, and the broken line shows the amount of the dye ink applied on the peripheral area 51. In this example, as shown in FIGS. 8A and 8B, the type of the applied ink is changed from the accumulative pigment ink to the dye ink which is less liable to accumulate on the ink-absorbing member in the peripheral area 51.

In FIG. 8B, the symbol A indicates the edge of the recording paper sheet, the symbol B indicates the limit for use of the pigment ink, and the symbol C indicates the position of the start of application of the dye ink.

With a usual ink-jet recording apparatus, the area having a width D between the edge A of the recording paper sheet and the limit B for use of the pigment ink where only the dye ink is used may be not more than 5 mm, or may be about 1 mm, and the area E between the limit B for use of the pigment ink and the position C of the start of application of the dye ink where the pigment ink and the dye ink are combinedly used has preferably a certain width in view of the quality of the formed image: specifically ranging from about 1 mm to about 10 mm. However, the width E may be zero depending on the object of use or the like with the proviso that the area of the width D where only the dye ink is used is provided. In FIG. 8B, the oblique-line shadow indicates the area where the pigment ink and the dye ink are mixedly used, in which the amount of the pigment ink in this area is the same as the amount of the dye ink therein, but is not limited thereto. The amounts of the inks are preferably set so as not to cause incompatible feeling between the area 50 where the image is formed by pigment ink and the peripheral area including the edge A where the image is formed by the dye ink in terms of image density, color tone, color saturation, and so forth. In the area where the pigment ink and the dye ink are mixedly used, the ratio of the inks is preferably controlled to keep balance of the printed condition. In this example, in the area of width E, the ratio of the pigment ink to the dye ink is linearly changed, but is not limited thereto. In this area, such ratio may be changed curvedly, stepwise, or curvedly-and-stepwise to avoid abrupt change of the color tone between the area 50 and the area 51, or other purpose. Such embodiments are included in the present invention.

In this Example 2, the recording head used was the same one as the one used in Example 1, but is not limited thereto naturally. Various recording heads can be used as shown below.

Nozzle constitutions of recording heads other than the one shown in FIG. 2 are explained below briefly.

Figure 9:
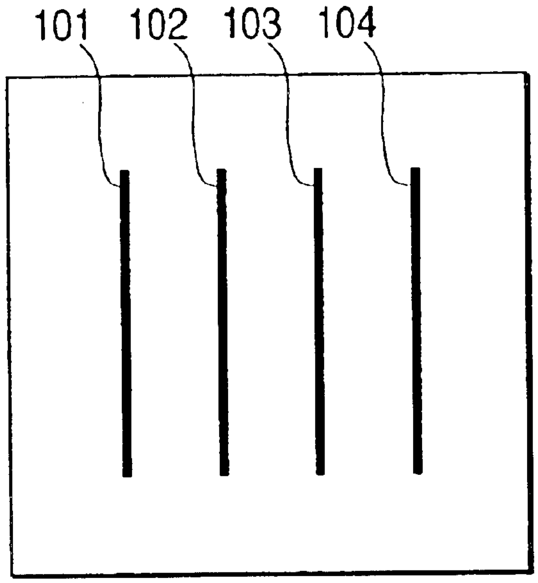
FIG. 9 is a schematic view of another recording head.

FIG. 9 shows nozzle rows 101–104 of a recording head: nozzles of row 101 for a black pigment ink, nozzles of row 102 for a cyan dye ink, nozzles of row 103 for a magenta dye ink, and nozzles of row 104 for a yellow dye ink. With such nozzles, for the area where a black pigment ink is judged not to be used, a black image is formed by a process black which is obtained by suitably mixing a cyan dye ink, a magenta dye ink, and a yellow dye ink.

Figure 10:
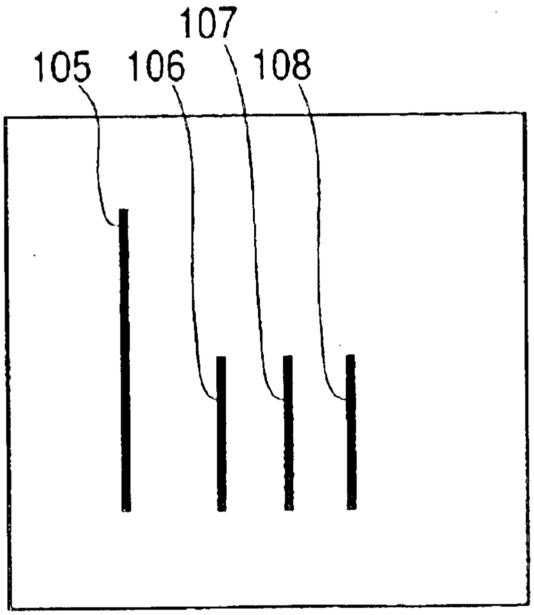
FIG. 10 is a schematic view of still another recording head.

FIG. 10 shows nozzle rows 105–108 of another recording head: nozzles of row 105 for a black pigment ink, nozzles of row 106 for a cyan dye ink, nozzles of row 107 for a magenta dye ink, and nozzles of row 108 for a yellow dye ink. This recording head has the nozzle row 105 longer than the other nozzle rows. This recording head forms images similarly to the one shown in FIG. 9. With the recording head shown in FIG. 10, the pitch of delivery of recording paper sheet for one scanning of the ink-jet recording head has to be controlled to be shorter in the area where the black pigment ink is not used than in the area where the black pigment ink is used.

Figure 11:
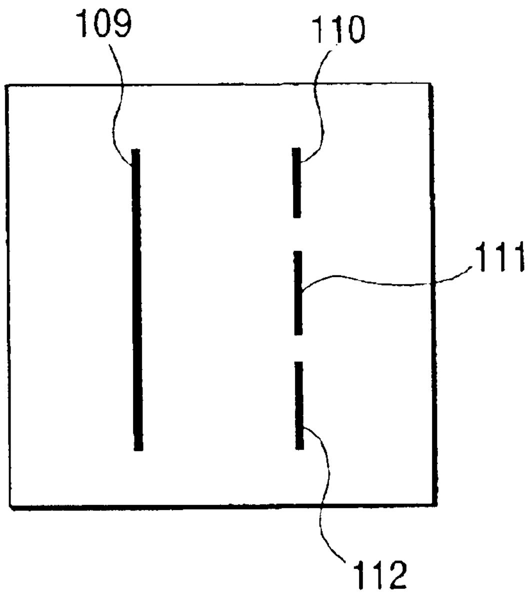
FIG. 11 is a schematic view of still another recording head.

FIG. 11 shows nozzle rows 109–112 of still another recording head: nozzles of row 109 for a black pigment ink, nozzles of row 110 for a cyan dye ink, nozzles of row 111 for a magenta dye ink, and nozzles of row 112 for a yellow dye ink. This recording head has the nozzle row 109 longer than the other nozzle rows 110–112, and the nozzle rows 110–112 are arranged in a line parallel to the nozzle row 109. This recording head forms images similarly to the one shown in FIG. 10.

Figure 12:
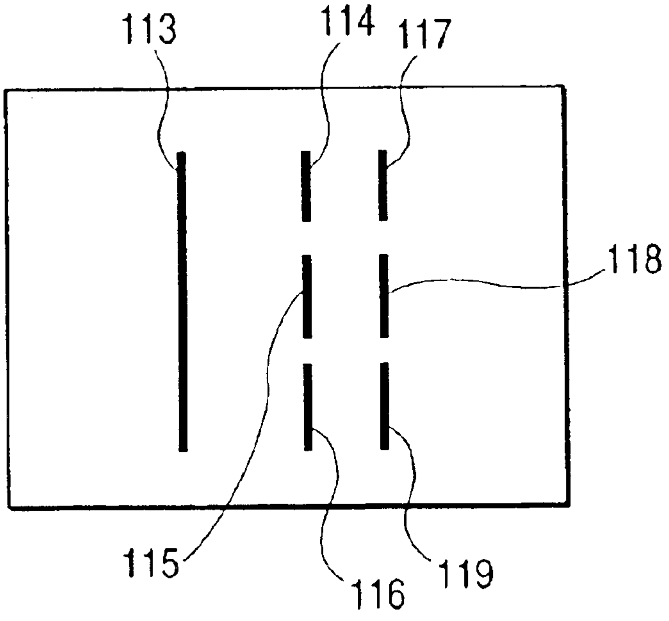
FIG. 12 is a schematic view of still another recording head.

FIG. 12 shows nozzle rows 113–119 of still another recording head: nozzles of row 113 for a black pigment ink, nozzles of row 114 for a cyan dye ink, nozzles of row 115 for a magenta dye ink, nozzles of row 116 for a yellow dye ink, nozzles of row 117 for a black dye ink, nozzles of row 118 for a photocyan dye ink, nozzles of row 119 for a photomagenta dye ink. This recording head has the nozzle row 113 longer than the other nozzle rows 114–119, and the nozzle rows 114–116 and the nozzle rows 117–119 are arranged in two lines each parallel to the nozzle row 113. The photocyan dye ink and the photomagenta dye ink are used when a fine image is formed at a lowered dye concentration or with less bleeding ink. In this case in the area where pigment ink is judged not to be used, a black image is formed with process black obtained by suitably mixing the cyan dye ink, the magenta dye ink, and the yellow dye ink, or with the black dye ink of nozzle row 117.

The present invention is also effectively applicable to an ink-jet recording apparatus and ink-jet recording method which employ an ink and a liquid composition that reacts with the ink when coming into contact therewith to form a reaction product (hereinafter referred to simply as a "liquid composition") to conduct recording with the reaction product of the ink and the liquid composition. In such a recording method, for example, an aqueous ink is mixed with an aqueous liquid composition to cause reaction to form a reaction product, such as agglomerate particles of the colorant component of the ink, thereby forming an image with the agglomerate particles. This method prevents the colorant of the ink from excessive penetration into the recording medium, thereby giving a recorded product having excellent color tone and high water-resistance. Such a recording method itself is known as is disclosed in Japanese Patent Application Laid-Open No. 10-95107, etc. However, in the cases where such a recording method is employed for recording on a peripheral area of the recording medium including the edge thereof, it is expected to bring about the same problem as that caused by the aforementioned low-penetrable ink. Therefore, in recording on a peripheral area including the edge of the recording medium with the ink-jet recording system with the reaction product of the ink colorant and the liquid composition capable of reacting with the colorant to form agglomerate particles of the colorant, the system is controlled to use only the ink for recording in the peripheral area without using the liquid composition. Thereby the aforementioned problem that the ink component accumulates on the ink-absorbing member on the platen can be solved, and as a result the staining and delivery failure of the recording medium are suppressed effectively.

If the absence of the liquid composition in image formation on the peripheral area causes color tone difference between the main recording area of the recording medium where the image is formed with the ink and the reactive liquid composition and the peripheral area, the liquid composition is used in the peripheral area in a decreased amount to reduce the color tone difference. In this case, the application amount of the liquid composition in the peripheral area can be decreased linearly, or stepwise toward the edge of the recording medium.

As described above, the present invention provides an ink-jet recording apparatus and an ink-jet recording process which can record images without causing accumulation of ink on an ink-absorbing member provided on a platen and without causing staining of a recording medium face or recording medium delivery failure.

What is claimed is:

1. An ink-jet recording apparatus comprising a low-penetrable ink which tends to accumulate an ink component on an ink-absorbing member, and a high-penetrable ink which less tends to accumulate an ink component on the ink-absorbing member, wherein the ink-jet recording apparatus is so controlled as to gradually decrease the amount of the low-penetrable ink to be applied and as to gradually increase the amount of the high-penetrable ink to be applied toward an edge of a recording medium when forming an image even in a peripheral area of a recording medium including the edge thereof.

2. The ink-jet recording apparatus according to claim 1, wherein the low-penetrable ink is a pigment ink, and the high-penetrable ink is a dye ink.

3. An ink-jet recording process comprising at least one of the steps of: (i) applying a low-penetrable ink which tends to accumulate an ink component on an ink-absorbing member; and (ii) applying a high-penetrable ink which less tends to accumulate an ink component on the ink-absorbing member, wherein an image is formed by controlling the step (i) so as to gradually decrease the amount of the low-penetrable ink to be applied and by controlling the step (ii) so as to gradually increase the amount of the high-penetrable ink to be applied toward an edge of a recording medium when forming the image even in a peripheral area of the recording medium including the edge thereof.

4. An ink-jet recording apparatus having an ejecting portion capable of ejecting a pigment ink and a dye ink, comprising:

a recording controlling portion capable of conducting margin-free recording for carrying out recording by ejecting ink even to a peripheral area of a recording medium including an edge of the recording medium; and an ink-absorbing member for receiving the ink ejected in conducting the margin-free recording, wherein the recording controlling portion controls the ejection of ink in the margin-free recording so that an amount of the pigment ink to be used is gradually decreased toward the edge of the recording medium and an amount of the dye ink to be used is gradually increased toward the edge of the recording medium, when the margin-free recording is conducted.

5. An ink-jet recording apparatus comprising:

a recording controlling portion capable of conducting margin-free recording for carrying out recording by ejecting ink to a peripheral area of a recording medium including an edge of the recording medium and an inner area inside the peripheral area; and an ink-absorbing member for receiving the ink ejected in conducting the margin-free recording, wherein the recording controlling portion controls the margin-free recording so as to permit the use of a pigment ink and a dye ink at the inner area and the use of only the dye ink at the peripheral area, when the margin-free recording is conducted.

6. An ink-jet recording method which is performed in an ink-jet recording apparatus having an ink-absorbing member for receiving ink that is ejected in conducting margin-free recording in which the ink is ejected even to a peripheral area of a recording medium including an edge of the recording medium, comprising the steps of:

providing an ejecting portion capable of ejecting a pigment ink and a dye ink;

judging whether the margin-free recording is to be conducted or not; and controlling the ejection of ink in the margin-free recording so as to gradually decrease an amount of the pigment ink to be used toward the edge of the recording medium and as to gradually increase an amount of the dye ink to be used toward the edge of the recording medium, when the margin-free recording has been judged to be conducted.

7. An ink-jet recording method comprising:

conducting margin-free recording for carrying out recording by ejecting ink to a peripheral area of a recording medium including an edge of the recording medium and an inner area inside the peripheral area, wherein use of a pigment ink and a dye ink at the inner area is permitted and use of only the dye ink at the peripheral area is permitted, when the margin-free recording is conducted.

8. An ink-jet recording apparatus comprising:

a recording controlling portion capable of conducting margin-free recording in which recording is effected by ejecting ink to a peripheral area of a recording medium including an edge of the recording medium and an inner area within the peripheral area; and an ink-absorbing member for receiving the ink ejected in conducting the margin-free recording, wherein said recording controlling portion controls the margin-free recording so as to use a smaller amount of a pigment ink for the peripheral area of the recording medium than for the inner area of the recording medium, when the margin-free recording is conducted.

9. An ink-jet recording method comprising the steps of:

conducting margin-free recording in which recording is effected by ejecting ink to a peripheral area of a recording medium including an edge of the recording medium and an inner area within the peripheral area, wherein the margin-free recording is conducted so as to use a smaller amount of a pigment ink for the peripheral area of the recording medium than for the inner area of the recording medium.

* * * * *

UNITED STATES PATENT AND TRADEMARK OFFICE

CERTIFICATE OF CORRECTION

PATENT NO. : 6,890,069 B2
APPLICATION NO. : 10/736746
DATED : May 10, 2005
INVENTOR(S) : Matsui It is certified that error appears in the above-identified patent and that said Letters Patent is hereby corrected as shown below:

COLUMN 8
After Line 33, --Example 2-- should be inserted as a new heading.

Signed and Sealed this

Twenty-seventh Day of May, 2008

JON W. DUDAS
*Director of the United States Patent and Trademark Office*